United States Patent

[11] 3,607,616

[72] Inventors Herbert S. Barbehenn;
Robert F. Williams, Jr., both of Rochester, N.Y.
[21] Appl. No. 778,330
[22] Filed Nov. 22, 1968
[45] Patented Sept. 21, 1971
[73] Assignee Eastman Kodak Company
Rochester, N.Y.

[54] LAMINATED AMORPHOUS AND CRYSTALLINE POLYPROPYLENE SHEETING
6 Claims, No Drawings

[52] U.S. Cl. .................................... 161/252,
156/334, 156/84, 161/402, 260/41
[51] Int. Cl. ....................................... B32b 27/12
[50] Field of Search............................ 161/151,
158, 166, 170, 252, 402; 156/334, 306, 297, 299, 300; 260/41

[56] References Cited
UNITED STATES PATENTS

| | | | |
|---|---|---|---|
| 3,073,002 | 1/1963 | Munt............................ | 161/402 X |
| 3,075,857 | 1/1963 | Fior et al. ..................... | 117/76 |
| 3,079,278 | 2/1963 | Naudain........................ | 117/122 |
| 3,085,921 | 4/1963 | Zeise............................. | 161/165 |
| 3,112,300 | 11/1963 | Natta et al. ................... | 260/93.7 |
| 3,126,297 | 3/1964 | Diamantopoulos et al... | 117/140 |
| 3,394,045 | 7/1968 | Gould............................ | 161/402 X |
| 3,360,488 | 12/1967 | Hall et al. ..................... | 156/334 |

Primary Examiner—Robert F. Burnett
Assistant Examiner—Roger L. May
Attorneys—Walter O. Hodsdon, Paul R. Holmes and John T. Lewis ABSTRACT: A laminated polypropylene sheeting having physical properties comparable to those of crystalline polypropylene sheeting and comprising a core of polypropylene fiber batting impregnated with amorphous polypropylene laminated to at least one and preferably between two sheets of crystalline polypropylene is disclosed.

LAMINATED AMORPHOUS AND CRYSTALLINE POLYPROPYLENE SHEETING

This invention relates to laminated films and sheets of amorphous and crystalline polypropylene which have physical properties comparable to those of films and sheets prepared from conventional purely crystalline polypropylene compositions, and more particularly to such films and sheets which have a core of amorphous polypropylene impregnated polypropylene fibers.

Polypropylene is a synthetic synthetic which finds wide application in the preparation of fibers, films and sheeting. For use in the latter applications, it is desirable that the polypropylene have a highly crystalline structure which serves to increase the strength of this versatile material. The inherent crystallinity of polypropylene is, in turn dependent upon its molecular structure or configuration, i.e., crystalline (or crystallizable) polypropylene exhibits a structure wherein the methyl groups are regularly distributed on the same side of the polymer chain. These material will hereinafter be referred to as "regularly arranged" polypropylenes.

However, some polypropylene, wherein the methyl groups are fairly randomly distributed upon either side of the polymer chain in the molecule, is not crystalline. Such "randomly arranged" polypropylene melts at a much lower temperature than does the "regularly arranged" polymer. Also, randomly arranged, noncrystallizable polypropylene has a substantially lower strength than does regularly arranged, crystallized polypropylene of comparable molecular weight.

In manufacturing polypropylene, the processes currently employed utilize so-called stereo-specific catalysts which are chosen for their ability to provide a resulting polypropylene with predominantly regularly arranged structure and hence a very high degree of crystallizability. However, despite the use of such catalysts, present polymerization techniques still result in the production of a product containing a significant proportion of randomly arranged polypropylene. Since the presence of this randomly arranged, amorphous (noncrystallizable) polypropylene would of necessity detract from the strength and temperature capabilities of articles manufactured from such polypropylene materials, it is the practice in the art to separate or remove practically all of the randomly arranged polypropylene by solvent extraction techniques. The recovered regularly arranged or amorphous polypropylene has heretofore generally been discarded as being unsuitable for use, particularly in film and sheeting applications.

Laminated films have previously been prepared from randomly arranged polypropylene and crystalline polypropylene in an attempt to make better use of this amorphous noncrystallizable polypropylene "byproduct" fraction. However, the physical properties of laminated films prepared by laminating films of crystalline polypropylene to randomly arranged amorphous polypropylene have been found to be unacceptable for film and sheet applications. When the amount of randomly arranged polypropylene used, for example, in the "core" of laminated films of this type (i.e., between two layers of oriented highly crystalline polypropylene), is sufficient to provide products that are of economic interest, the relatively poorer strength and poorer temperature properties of the randomly arranged, amorphous polypropylene predominate the properties of the laminate. Glass fibers are too expensive to be used to reinforce the randomly arranged, amorphous polypropylene core in such laminates. In addition, glass fibers would require special sizing in order to yield optimum benefits in such laminates.

It is an object of the present to to provide a technique by which randomly arranged polypropylene can be utilized in sheet and film laminates without significantly sacrificing temperature and strength properties or increasing the cost of the resulting products to impractical levels.

It is another object of the present invention to provide a polypropylene film or sheeting having the strength and temperature capabilities of crystalline polypropylene sheets while being composed in large part of amorphous, noncrystallizable (randomly arranged) polypropylene.

Other objects and advantages will be made obvious to those skilled in the art by a consideration of the following description.

The above objectives can be accomplished by incorporating inexpensive, oriented polypropylene fibers into the amorphous layer in laminates comprising alternate layers of randomly arranged and regularly arranged polypropylenes.

Thus, the present invention involves laminated articles having alternating layers comprising:

(1) a layer consisting of (a) fibers of largely crystalline (i.e., at least about 75 percent crystalline) polypropylene, and (b) largely amorphous, randomly arranged polypropylene (i.e., at least about 80 percent noncrystalline); and (2) at least one layer of largely crystalline polypropylene. Preferred laminated articles are those containing two layers of the largely crystalline polypropylene. having a "core" layer of the mixture of fibrous and amorphous polypropylene. Still further preferred are those laminate articles in which the largely crystalline polypropylene layer is biaxially oriented, and/or in which the fibers of largely crystalline polypropylene are oriented and arranged through the "core" layer in a randomized fashion.

Actually any fiber that is compatible with randomly arranged polypropylene, which can adhere strongly thereto without the necessity for the additional use of a "sizing" or "-subbing" material, and which has a melting point at least as high as the largely crystalline polypropylene layer can be used in the practice of the present invention. However, the use of fibers of largely crystalline polypropylene is generally preferred. An inexpensive source of very valuable, oriented, largely crystalline polypropylene is the so-called "carded batting," which is a byproduct material from processes involving the manufacture of polypropylene baler twine and carpet "backing" yarn. Such "carded batting" is made up of a mass of oriented, chopped fibers having varying lengths ranging from about 0.1 inches to about 5 inches, which fibers are randomly arranged (with respect to the other fibers contained in the batting). Generally, these fibers may be described as being largely crystalline polypropylene, having diameters of from about 0.25 to about 3 mils, having an average density of from about 0.90 to about 0.94 g/cc. and an average molecular weight of from about 50,000 to about 700,000.

Length of the particular fibers utilized in the "core" does not seem critical and hence byproducts of other fiber processing techniques can also be adopted for use in the "-core" layer of this invention. Thus, short polypropylene fibers which are unsatisfactory for baler twine and carpet backing can be salvaged and used herein to provide low cost improved polypropylene sheeting. Longer fibers can be used.

The amorphous polypropylene core "impregnant" can be prepared from the fractions separated in commercial manufacture of regularly arranged polypropylene as explained above. The amorphous polypropylene can be applied to the fibers in any of several ways, i.e., from solvent dopes, as a melt, or by mixing the fibers with a powdered form of the resin in a mixer such as the Banburry-type mixer.

Apparently, the particular manipulative procedures that are employed in the construction of manufacture of the laminated articles of this invention are not critical, insofar as the successful practice thereof is concerned. Thus, if desired, a "fluid" mixture of (a) the largely amorphous polypropylene core "impregnant" and (b) solid fibers of largely crystalline polypropylene (at a temperature that is too low to melt either the fibers or a layer fluid,"largely crystalline polypropylene onto which it is cast) can simply be leveled onto a layer of such largely crystalline, relatively higher melting, polypropylene. Then, if desired, another layer of largely crystalline relatively higher melting polypropylene can be placed onto the softened layer (containing the fibers). The temperature of the resulting laminate can then be permitted to fall to below that point at which the largely amorphous material in the "core" solidifies. Alternately, fibrous "carded batting" of oriented, stretched polypropylene can simply be placed evenly over a layer of preferably biaxially oriented largely crystalline polypropylene, "fluid, " melted largely amorphous, randomly arranged polypropylene can be flowed onto the fibers, and the resulting hot mixture of largely amorphous polypropylene plus fibers can then be permitted to cool and set up. In still another method, the largely amorphous polypropylene can be blended with the fibers while the largely amorphous material is dissolved in an appropriate solvent. Thereafter, the solvent can be removed, preferably by heating the mixture, to leave behind the desired layer of polypropylene fibers and largely amorphous polypropylene "impregnant."

Amorphous, randomly arranged polypropylene is soluble in a large variety of solvents including: aromatic hydrocarbons such as toluene, xylene, dechydronaphthalene; aliphatic hydrocarbons containing from 5 to 11 carbon atoms, such as pentane, hexane and nonane; and chlorinated hydrocarbons, such as methylene, perchloroethlene, and also chlorinated aromatic hydrocarbons such as chlorobenzene, or combinations of any of the above solvents and many other solvents. The resin solids content of these solutions of amorphous, randomly arranged polypropylenes should generally range between about 1 and about 50 percent by weight for effective impregnation of the fiber batting. When a solution of the largely amorphous resin is used, the solution can be applied to the fiber batting by dispersion, rolling or any other suitable method and the solvent evaporated to yield a core sheet.

Caution should be exercised not to melt or disorient the fibers when the largely amorphous resin is applied as a melt, or when the fibers and amorphous resin are mixed under conditions of elevated temperatures and/or pressure. For example, when the preferred oriented, largely crystalline polypropylene fibers are used as the fiber batting, melt temperatures should not exceed about 160° C. at atmospheric pressure. These same cautions must also be observed during the laminating procedure to protect the fibers from degradation at that stage of sheet preparation.

Although the particular amorphous, randomly arranged polypropylene utilized in the core layer is not critical, it is preferred to use a resin having a molecular weight ranging from about 6,000 up to about 24,000 and having a density of from about 0.80 to about 0.90 g/cc. Particularly good binding of the "core," and hence laminated sheets of superior quality, have been found using a largely amorphous polypropylene binder having an average molecular weight of between about 10,000 and about 18,000. It is also preferred that the softening temperature of the largely amorphous polypropylene "impregnant" material be at least about 5° C. below that of the largely crystallized polypropylene layer of the articles of this invention.

In order to provide an improved sheeting of the type described herein, it is advantageous that the "amorphousfiber" layer contain from about 3 to about 9 times as much amorphous (randomly arranged) polypropylene, by weight, as compared with the weight of the fibers contained in the core. Particularly useful sheeting has been produced, as in the examples below, when the weight ratio of largely amorphous polypropylene to fibers in that layer is from about 6:1 to about 8:1, respectively.

Once the amorphous polypropylene-polypropylene fiber layer has been formed, at least one and preferably two sheets of largely crystalline polypropylene are laminated thereto. Conventional laminating techniques can be used to accomplish this. Such lamination, as demonstrated in the examples below, can be achieved, for example, by compression rolling at from about 190° to about 240° F. under up to about 200 lbs./linear inch of pressure or by placing the layered structure in a hydraulic press at from about 225 to about 275° C. under as much as 2,000 lbs. per square inch of pressure.

Although broad and not necessarily limiting conditions have been presented for forming laminates by compression rolling and pressing in a hydraulic press, the basic concepts of this invention can be applied to other methods of fabrication including coextrusion of films on sheets.

The selection of a particular largely crystalline polypropylene (which forms the one or more outer layers of the laminated articles of this invention) is not a critical aspect of the invention and any such polymer suitable for film or sheeting use can be used in the laminated product; such largely crystalline polypropylene polymers as those having a density of from about 0.9 to about 0.95 grams/cc. and flow rates of from about 2.0 to about 5.0 dg/min. at 230° C. have been found to provide high quality laminated articles having the advantages described above.

When the laminated articles of this invention comprise a "core" of the above-described stretched polypropylene fiber batting impregnated with the largely amorphous polypropylene (also described above), and two layers of the largely crystalline polymer (one on either side of the core,) are laminated thereto, the finished laminated article should preferably contain from about 25 to about 300 percent by weight of the largely crystalline polymer (forming the outer layers), based upon the weight of the fiber contained therein. The relative amounts of crystalline polymers will depend largely upon the thickness of the various layers, which in turn will be determined by the end use to which the film will be put. Such requirements are clearly open to broad variations and modification within the scope of this disclosure, either within or without the preferred limits just described.

Those particularly preferred laminated articles in sheet or film form, in which the polypropylene fibers are arranged in a fairly randomized fashion through the "core" layer(s), have an additional valuable property that was heretofore unavailable. This property relates to the ability of the resulting sheet to perform satisfactorily as a shrinkable, puncture resistant film or sheet material that is particularly valuable in the packaging art. Thus, whereas heretofore, shrinkable films of polypropylene were available, such conventional films were prone to punctures at at sharp places on the finished products. The incorporation of ordinary fibers (to resist puncturing) interfered with the ability of the films to shrink acceptably (uniformly and to a sufficient amount). It should be noted that the largely crystalline polypropylene layers of these particularly preferred laminated articles are biaxially oriented and have individual thicknesses of from about 0.05 to about 10 mils, while the total thickness of each reinforced layer (containing the mixture of fibers plus largely amorphous polypropylene) is within the range of from about 5 to about 45 mils. If a combination of fairly uniformly controlled shrinkage and curling is desired when such laminated articles are heated (above the second order transation temperature of the largely crystalline polypropylene layer(s), but below the melting point thereof) via conventional "shrink-packaging" techniques, the relative thicknesses of the respective "crystalline" (cap) layers can be varied widely.

The following examples illustrate the application of our invention and the properties of films produced in accordance therewith.

EXAMPLE I

A largely crystalline (about 86 percent crystalline) propylene polymer having a density of 0.904 grams/c.c. and flow rate of 4.5 dg/min. at 230° C. and 2.16 kg. load is extruded as a 5 mil film then compression rolled conventionally to a thickness of 1 mil. A section of this 1 mil compression rolled film is then covered with carded batting of polypropylene fibers produced as byproduct from the socalled "F-process" (for manufacturing polypropylene fibers suitable for use as binder twine), which batting weighs 5.8 oz./yd$^2$. A hexane dope (9:1 solvent to polymer) of an amorphous, largely noncrystallizable propylene polymer having a density of 0.82 grams/c.c. and an approximate molecular weight of 12,000 is then poured evenly over the layer of batting. The amount of largely amorphous propylene polymer deposited from the dope in the batting produces a mixture having a weight ratio of fibers to largely amorphous polypropylene of 1:6. After the hexane is evaporated from the mixture at room temperature the other side of the fiber/amorphous polypropylene mixture layer is covered with a section of the compression rolled largely crystalline polypropylene film. This three-ply structure is then pressed at 100° C. with 200 lbs./in.² for 3 minutes to form a three-ply laminate 32 mils thick. The weight ratio of largely crystalline polypropylene film to polypropylene fiber mat to largely amorphous polypropylene in the final laminated article is 0.55:1:6.

Another three-ply laminate identical to the preceding laminate (except that no polypropylene fibers are incorporated into the amorphous polypropylene core) is prepared for comparison.

The largely crystalline polypropylene composition from which the compression rolled film was prepared is also extruded as 22 mil sheeting for comparison with the laminates.

The two laminates and the extruded sheet, after being stored in a −25° F. freezer for one hour, are then bent over a 90° angle. The laminate without fibers and the extruded sheeting shatter quickly in this test, but the laminate containing fibers in the core show no sign of failure after bending.

EXAMPLE II

A three-ply stack of two outer skins of compression rolled largely crystalline polypropylene films and a core of polypropylene fiber batting impregnated by largely amorphous polypropylene is prepared by the procedure of Example I. Weight ratio of compression rolled "crystalline" polypropylene film to polypropylene fiber batting to "amorphous" polypropylene in this stack is 2:1:8, respectively. A 15 mil laminate is prepared from one-half of this stack by passing it through the nip of a 10½ inch compression roll mill with the rolls heated to 220° F. and clamped with less than 200 lbs./linear inch pressure, using water as a lubricant. The other half of this stack is laminated in a hydraulic press heated to 248° F. and clamped with less than 2,000 lbs./in.² pressure to form a 16 mil laminated sheet. Properties determined on these laminates are:

|  | Laminate Formed In Hydraulic Press | Compressions Rolled Laminate |
| --- | --- | --- |
| Young's Modulus |  |  |
| along | 59,600 p.s.i. | 48,000 p.s.i. |
| across | 48,000 p.s.i. | 31,200 p.s.i. |
| Tensile Strength |  |  |
| along | 4,400 p.s.i. | 4,500 p.s.i. |
| across | 1,300 p.s.i. | 2,500 p.s.i. |
| % Elongation |  |  |
| along | 48 | 48.0 |
| across | 13 | 9.5 |
| Tear |  |  |
| along | 864 g. | 608 g. |
| across | 1,062g. | 944 g. |
| Folds |  |  |
| along | 500+ | 500 |
| across | 500+ | 116 |
| Gardner Variable | 7 in./lbs. | 3.0 in./lbs. |

EXAMPLE III

A polypropylene resin having nominal flow rate of 2.5 dg./min. at 230° C. and 2.16 kg. load and a conditioned density of 0.910 g./ml. is extruded as a one mil film. This film is used in place of compression rolled film used in examples I and II to form three-ply laminates by the technique of example I. Two laminates are prepared with this film, one having a weight ratio of "crystalline" polypropylene to fiber batting to "amorphous" polypropylene of 0.5:1:3 while the others laminate weight ratio is 0.5:1:6, respectively. Both final laminates are found to be 22 mils thick.

Samples of both laminates are stored for 5 hours in a freezer at −25° F. While at −25° F. the laminates are bent over 90° angles with no signs of cracking or brittleness.

From the above examples, the improved properties of films and sheeting produced in accordance with this invention should be clear. The previously relatively useless amorphous, randomly arranged polypropylene byproduct of crystallizable propylene polymer manufacture thus can become an important part of a remarkably strong and useful product whose production from an economic point of view is competitive with presently used, largely crystalline polypropylene films and sheeting.

The invention has been described in detail with particular reference to preferred embodiments thereof, but it will be understood that variations and modifications can be effected within the spirit and scope of the invention.

We claim:

1. A solid article comprising at least one first layer of largely crystalline high density polypropylene laminated to a second layer consisting essentially of a mixture of
    (a) randomly arranged amorphous, polypropylene being at least 80 percent noncrystalline, and
    (b) polypropylene fibers being at least about 75 percent crystalline; the weight ratio of said amorphous polypropylene to said fibers in said second layer being from about 3:1 to about 9:1.

2. A solid article as in claim 1, wherein said second layer is a core layer sealed between cover layers of said largely crystalline polypropylene.

3. A solid article as in claim 2, wherein said article is a film and said fibers are distributed randomly and uniformly through said core layer.

4. A solid article as in claim 3, wherein the polypropylene in said fibers have a density of from about 0.90 to about 0.94 and a molecular weight of from about 50,000 to about 700,000.

5. A solid article as in claim 4, wherein the weight ratio in said core layer of said amorphous polypropylene to said fibers is between about 6:1 and about 8:1, and said largely crystalline polypropylene in said cover layer has a density of from about 0.9 to about 0.95 grams/per cubic centimeter.

6. A solid article as in claim 5, wherein said article is a three-layered laminate, and one of said cover layers is thicker than the second cover layer.

PO-1050
(5/69)

UNITED STATES PATENT OFFICE
CERTIFICATE OF CORRECTION

Patent No. 3,607,616          Dated September 21, 1971

Inventor(s) Herbert S. Barbehenn and Robert F. Williams, Jr.

It is certified that error appears in the above-identified patent and that said Letters Patent are hereby corrected as shown below:

Column 1, line 10, delete "synthetic" in the second instance, insert --- resin ---

Column 1, line 66, delete "to" in the first instance, insert --- invention ---

Column 2, line 66, delete "fluid,"", insert --- of ---

Column 3, line 45, delete "found", insert --- formed ---

Column 4, line 42, delete "0.05", insert --- 0.5 ---

Signed and sealed this 25th day of April 1972.

(SEAL)
Attest:

EDWARD M. FLETCHER, JR.          ROBERT GOTTSCHALK
Attesting Officer          Commissioner of Patents